April 12, 1966  D. HOLLEY  3,245,528
PLASTIC BOTTLE PACKAGING
Filed April 10, 1964  2 Sheets-Sheet 1

INVENTOR.
DANFORTH HOLLEY
BY *Whittemore,*
*Hulbert & Belknap,*
ATTORNEYS

April 12, 1966     D. HOLLEY     3,245,528
PLASTIC BOTTLE PACKAGING
Filed April 10, 1964     2 Sheets-Sheet 2
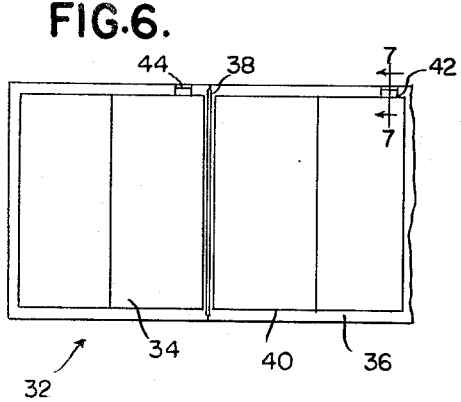
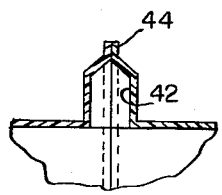
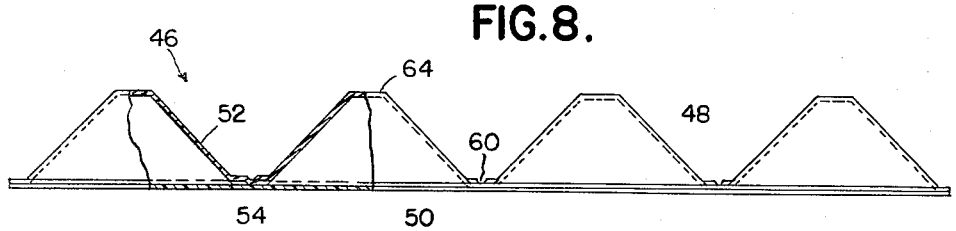
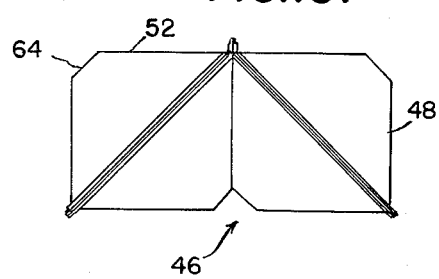
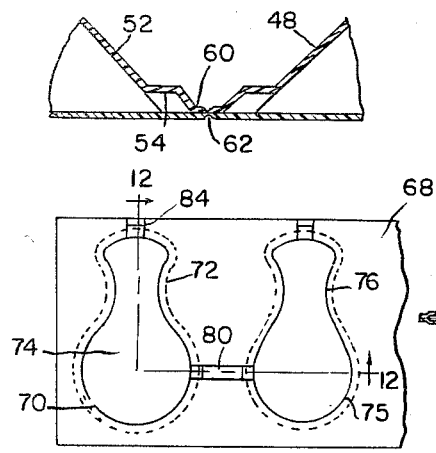
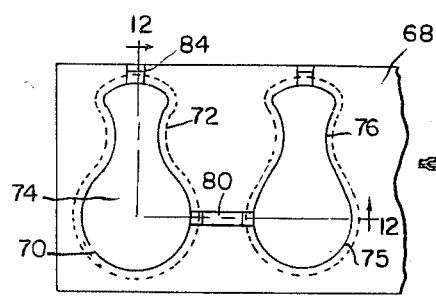
INVENTOR.
DANFORTH HOLLEY
BY Whittemore,
Hulbert & Belknap
ATTORNEYS

United States Patent Office 3,245,528
Patented Apr. 12, 1966

3,245,528
PLASTIC BOTTLE PACKAGING
Danforth Holley, Grosse Pointe Shores, Mich., assignor to Holley Plastics Company, Warren, Mich., a corporation of Michigan
Filed Apr. 10, 1964, Ser. No. 358,705
4 Claims. (Cl. 206—65)

The invention relates to plastic packaging and refers more specifically to plastic bottle packaging structure constructed for multiple production and convenient storage, shipment and use.

In the past bottles have usually been made from frangible material, such as glass or clay, so that breakage thereof in shipment and storage has been a problem. Also, due to the frangible nature of prior bottles elaborate shipment and storage cases often having separate pockets for individual bottles have been required.

The use of metals in producing bottles has in the past been limited to special applications due to the difficulty of working metal to produce bottles. To some extent the same problem is present with glass bottles since the production equipment necessary to produce glass bottles is both complicated and expensive.

Where plastic bottles have been produced in the past they have been deficient in that they have not fully utilized the possibility of the material of which they are constructed. Thus, prior plastic bottles have been formed so that they require separate exterior packaging and are not easily stacked for shipment, storage or display. Additionally prior plastic bottles have not been constructed in a manner to permit efficient filling or utilization thereof.

It is one of the purposes of the present invention to provide improved plastic bottle packaging structure.

It is another object to provide plastic bottle packaging structure including a plurality of connected, individual, simultaneously produced plastic bottles.

Another object is to provide plastic bottle packaging structure as set forth above including means for filling the individual plastic bottles through a single opening in one of the bottles.

Another object is to provide plastic bottle packaging structure as set forth above wherein the individual plastic bottles are formed and connected to fold into a compact package for shipment, storage or display.

Another object is to provide plastic bottle packaging structure as set forth above wherein the individual plastic bottles are formed and spaced to nest between the individual plastic bottles of similar packaging structure and to prevent relative lateral as well as longitudinal movement of the nested plastic structures.

Another object is to provide plastic bottle packaging structure comprising a first elongated substantially rectangular plastic base sheet having a plurality of pockets spaced longitudinally thereof which pockets have a triangular cross-section longitudinally of the sheet and a cover sheet positioned over the open side of the pockets and sealed around each of the pockets to the base sheet.

Another object is to provide plastic bottle packaging structure as set forth above wherein the base sheets are constructed to nest within each other for economy of space in separate shipment thereof.

Another object is to provide structure as set forth above wherein a second base sheet is substituted for the cover sheet whereby the individual bottles have a rectangular cross-section.

Another object is to provide structure as set forth above wherein a communicating passage is provided between adjacent individual bottles to permit filling of each of the plastic bottles from a single opening in one of the individual bottles.

Another object is to provide structure as set forth above wherein the individual bottles are spaced longitudinally of a plastic bottle packaging structure and the apex of the triangular pockets is provided with a flat surface extending parallel with the cover sheet and of substantially the same length longitudinally of the cover sheet as the spacing between the individual bottles.

Another object is to provide plastic bottle packaging structure which is simple in construction, economical to manufacture and efficient in use.

Other objects and features of the invention will become apparent as the description proceeds, especially when taken in conjunction with the accompanying drawings, illustrating perferred embodiments of the invention, wherein:

FIGURE 6 is an elevation view of a modification of the plastic bottle packaging structure illustrated in FIGURES 1-5.

FIGURE 7 is an enlarged section view of a portion of the plastic bottle packaging structure illustrated in FIGURE 6 taken on the line 7—7 in FIGURE 6.

FIGURE 8 is an elevation view partly in section of a second modification of the plastic bottle packaging structure illustrated in FIGURES 1-5.

FIGURE 9 is an enlarged section view of a portion of the plastic bottle packaging structure illustrated in FIGURE 8.

FIGURE 10 is an elevation view of the plastic bottle packaging structure illustrated in FIGURE 8 showing the plastic bottle packaging structure in folded position.

FIGURE 11 is a plan view of another modification of plastic bottle packaging structure constructed in acccordance with the invention.

FIGURE 12 is a section view of the packaging structure illustrated in FIGURE 11 taken substantially on the line 12—12 in FIGURE 11.

Figure 1:
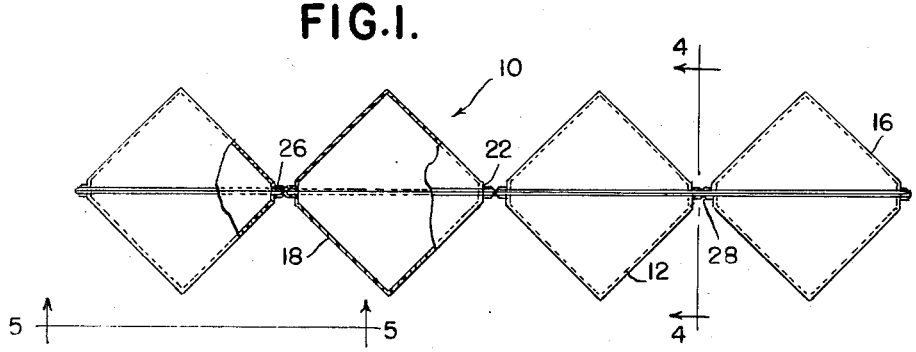
FIGURE 1 is an elevation view of plastic bottle packaging structure constructed in accordance with the invention and illustrated partly in section.

With the particular reference to the figures of the drawing, one embodiment of the present invention will now be considered in detail.

The plastic bottle packaging structure 10 illustrated in FIGURE 1 comprises a pair of elongated plastic base sheets 12 having pockets 16 positioned longitudinally thereof and sealed together around the periphery of each of the pockets 16 to provide individual plastic bottles 18. Filling and pouring structure 20 is provided between the individual plastic bottles 18 to permit filling of all of the individual plastic bottles 18 in a plastic bottle packaging structure 10 through a single opening in any of the individual plastic bottles 18. Structure 20 also forms pouring spouts for the individual plastic bottles 18.

Figure 2:
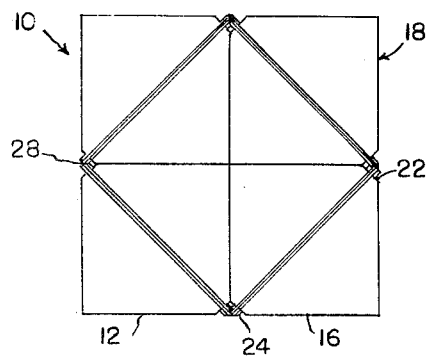
FIGURE 2 is an elevation view of the plastic bottle packaging structure illustrated in FIGURE 1 in a folded position.

As shown best in FIGURE 2 with the individual plastic bottles 18 filled with a flowable product, such as milk, mustard, sugar, cosmetics or the like, the plastic bottle packaging structure 10 may be readily folded into the form shown in FIGURE 2 to provide a rectangular unit for shipment, storage or display.

Further, it will be readily understood that if desired the plastic bottle packaging structures 10 may be nested in an unfolded condition for shipment or storage and further that the individual base members 12 may themselves be nested together for economy of space during shipment before they are sealed together to produce the plastic bottle packaging structures 10.

More specifically the base members 12 are an elongated rectangular plastic sheet formed with pockets 16 extending transversely thereof which pockets have a substantially triangular transverse cross section longitudinally of the plastic sheet.

The pockets 16 are further provided with vertically extending side portions 22 adjacent each other. Centrally of the transverse dimension of the pockets 16 a semi-cylindrical recess 24 is provided extending between the vertically extending side portions 22. Thus with the base members 12 sealed together around the exterior of the pockets 16 but not across the semi-cylindrical recesses, individual plastic bottles 18 are formed which include a sealed passage 26 therebetween.

Figure 3:
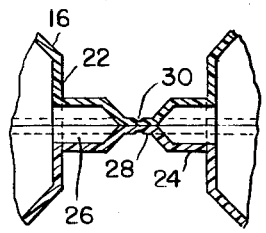
FIGURE 3 is an enlarged section view of a portion of the plastic bottle packaging structure illustrated in FIGURE 1.
Figure 5:
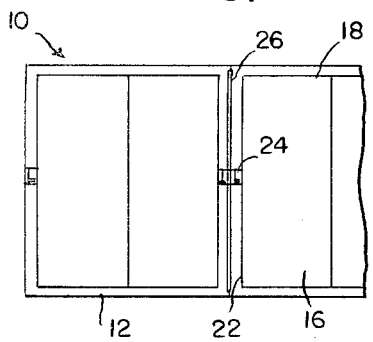
FIGURE 5 is a bottle view of a portion of the plastic bottle packaging structure illustrated in FIGURE 1 taken substantially on the line 5—5 in FIGURE 1.
Figure 4:
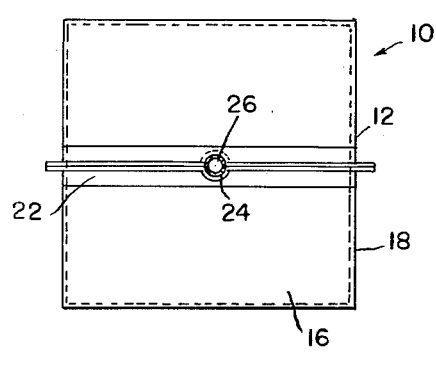
FIGURE 4 is an enlarged section view of the plastic bottle packaging structure illustrated in FIGURE 1 taken substantially one the line 4—4 in FIGURE 1.

The individual bottles 18 may then be filled from either end or if desired centrally with a desired product which is flowable from one plastic bottle to the other through the passages 26. After each of the plastic bottles are filled the bottles 18 are individually sealed by providing a transverse seal 28 across the passages 26. A deep seal tear line 30 may also be provided across the entire plastic bottle packaging structure at the same time that the separate passages 26 are sealed, as shown best in FIGURES 3 and 5.

The plastic may be any material suitable for the product to be packaged. Preferably the plastic is sealable by heat and pressure applied between two sheets thereof. The heat may of course be provided by placing a high frequency signal thereacross, while the pressure is applied in the usual manner by means of a conventional press.

The plastic bottle packaging structure 10 thus produced is not frangible in the manner of glass or clay and the material is obviously much easier to work than metal. In addition it will be noted that only one plastic form is needed to produce the bottle structure and that the structure so produced is particularly easily filled and stacked for storage or shipment as are the individual portions thereof.

With respect to this last feature it will be noted that that folded rectangular form of the plastic bottle packaging structure 10 is particularly tight and desirable due to the filling and pouring structure 20 provided therebetween wherein the separate pockets 16 are provided with the vertically extending side portions 22 and the passages 26 between the individual pockets 18 are provided with a slope at the outer edge thereof after the seal 28 is produced which is the same as the slope of the corresponding sloping sides of the triangular pockets.

A modification 32 of the plastic bottle packaging structure 10 is illustrated in FIGURE 6. In FIGURE 6 the triangular pockets 34 of the separate base members 36 are positioned immediately adjacent each other except for the provision of a space to permit the production of a deep seal tear line 38 between the separate bottles 40 during sealing of the base members together.

The individual plastic bottles 40 are provided with the cylindrical passage 42 in the sides thereof similar to passages 26 for individual filling of the plastic bottles 40. The cylindrical openings 42 are provided with a seal 44 after the filling operation is completed as shown best in FIGURE 7.

Another modification 46 of the plastic bottle packaging structure 10 is illustrated in FIGURES 8–10. The packaging structure 46 includes a single base member 48 and a cover sheet 50 whereby the individual bottle members 52 are generally triangular in cross-section longitudinally of cover sheet 50. The individual bottle members 52 of the packaging structure 46 are further spaced apart longitudinally of the base member 52 to provide space for the semi-cylindrical passages 54 between the individual pockets 48 of the base member 52. Again the seal 60 and tear line 62 are provided after bottles 52 are filled.

To permit nesting of individual packaging structures 46 as set forth in FIGURE 8 with the packages turned back-to-back the apex of the substantially triangular cross-section of the separate pockets 48 are removed to provide a flat portion 64 thereon of substantially the same dimension longitudinally as the base member as the space between the individual pockets 52. Alternatively the plastic packaging structure 46 may be folded for shipment or storage as illustrated in FIGURE 10 to provide a compact rectangular unit.

It will be understood of course that the plastic bottle packaging structures illustrated in FIGURES 1, 6 and 8 may include two or more individual bottles which in accordance with the invention may be folded to provide a compact rectangular package for shipment or storage. It is of course desirable with the units disclosed for there to be an even number of individual bottles in each bottle packaging structure.

The modification 66 of the invention illustrated in FIGURES 11 and 12 comprises a pair of elongated plastic sheets 68 having oppositely protruding pockets 70 shaped as shown in FIGURES 11 and 12 therein which plastic sheets are sealed together about the periphery of the pockets 70 by convenient means, such as heat and pressure. A plurality of separate individual bottles 74 for articles, such as salad oils and the like, are thus produced spaced longitudinally of the sheets 68.

Deep-seal tear lines 72 may be provided at the same time as the individual sheets are sealed together around the individual pockets if desired.

As shown best in FIGURE 11, with the sheets turned in opposite directions, the separate bottles 74 nest due to the particular arcuate configuration thereof to prevent displacement of the nested packages transversely and longitudinally. The interlocking of the separate packaging structures 66 is increased by the provision of a relatively thin neck portion 76 on the bottles 74 and the transverse passages 78 formed in the sheets 68 extending between the body portions 75 of the bottles 74. With two package structures nested the passages of one package structures fit within the concave area provided by the thin neck portion 76 of the bottles 74 of the other package structure.

The passages 78 are used to fill the separate bottles from a single opening in the packaging structure 66 and may be subsequently sealed together, as indicated at 80 between the tear lines 72. The end bottle 74 may be filled from the end thereof and subsequently sealed as at 84. Alternately each of the bottles 74 may be separately filled at the end thereof and sealed in a manner as indicated at 84 or at 44 in FIGURE 7.

While one embodiment of the present invention has been disclosed in detail together with a plurality of modifications thereof, it will be understood that other embodiments and modifications of the invention are contemplated. It is the intention to include all such embodiments and modifications as are defined by the appended claims within the scope of the invention.

What I claim as my invention is:

1. Plastic bottle packaging structure comprising a pair of elongated substantially rectangular plastic sheets having oppositely extending pockets therein sealed together about the periphery of the pockets to provide a plurality of longitudinally spaced apart bottles each having an arcuate upper and lower portion connected by a relatively thin neck portion constructed and arranged to nest between individual separate bottles of similar plastic bottle packaging structure turned transversely in an opposite direction.

2. Structure as set forth in claim 1 wherein a passage is provided extending between the arcuate lower portion of adjacent separate bottles extending transversely of the neck portion of a nested separate bottle with a pair of the plastic bottle structures in nested relation.

3. A plastic bottle packaging structure comprising a pair of substantially rectangular elongated plastic sheets, one of which includes longitudinally spaced apart pockets therein having longitudinally offset transversely extending portions, said sheets being sealed together about the periphery of the pockets to provide longitudinally spaced apart individual sealed plastic bottles the longitudinally offset transversely extending portions of which overlap longitudinally and interlock on nesting of a pair of packaging structures for preventing relative transverse as well as relative longitudinal movement between nested packaging structures.

4. Structure as set forth in claim 3 wherein each of the spaced apart bottles of a packaging structure includes a relatively thin neck portion and the packaging structure further includes passages extending between the individual bottles positioned to fit within the neck portion of an oppositely positioned and nested similar packaging structure.

References Cited by the Examiner

UNITED STATES PATENTS

| 2,813,799 | 11/1957 | Bender et al. | 206—56 |
| 2,908,383 | 10/1959 | Vogt | 206—65 |
| 2,917,216 | 12/1959 | Despres | 206—65 |
| 3,029,937 | 4/1962 | Vogt | 206—56 |

FOREIGN PATENTS 1,079,195   5/1954   France.

THERON E. CONDON, *Primary Examiner.*